UNITED STATES PATENT OFFICE.

JOSEPH HAY AMIES, OF PHILADELPHIA, PENNSYLVANIA, ASSIGNOR TO THE AMIES ASPHALT COMPANY, OF PHILADELPHIA, PENNSYLVANIA, A CORPORATION OF SOUTH DAKOTA.

PAVING COMPOSITION.

934,495.  Specification of Letters Patent.  Patented Sept. 21, 1909.

No Drawing.   Application filed February 20, 1909.  Serial No. 479,258.

*To all whom it may concern:*

Be it known that I, JOSEPH HAY AMIES, a citizen of the United States, residing at Philadelphia, in the county of Philadelphia and State of Pennsylvania, have invented a certain new and useful Improved Paving Composition, of which the following is a specification.

Attempts to secure inherent stability of the mass in a composition for road making have been many. These attempts have however heretofore failed to secure the object desired.

I will now describe and finally claim a process by which I secure perfect inherent stability, that is, my composition when laid and properly compressed is entirely without voids, and therefore the body of the composition is hermetically sealed, as it were, and on this account as well as on other accounts the road body cannot disintegrate. As the said composition maintains uniform elasticity in all temperatures and aging is eliminated, the roads built thereof will be very durable.

I crush stone in ordinary crushers in ton lots. The largest stone as it comes from the crusher, should go through a two inch ring or mesh. All the various sizes of the crushed stone are separated. I measure and then weigh the different sizes of the stone, in each ton, and last of all I weigh the stone dust. I do this over and over again and note the variations in the weights and measures of different grades of stones. In making my bituminous composition, accuracy is attained so that all the parts of a crushed ton of stone will be used in each separate batch of mixing. These are placed in a cold condition in a mixing machine and coated with a light oil, also in a cold condition. I then mix in a heavy hot asphaltic or bituminous cement, or the like, and then mix in a due quantity of crushed calcium oxid. No water is used with the calcium oxid at any time. The said calcium oxid will secure the water from the stones and from the volatile oils and asphaltic cement which to a greater or less degree will be found therein, and the result will be a dry granular composition. Preferably this composition should be laid and compressed before the slaking of the calcium oxid begins, and this may be easily done because the slaking of the calcium oxid will not usually begin for several hours after the mixing has been completed. When it is laid and compressed, as described above, and the fine grains of the crushed calcium oxid begin to slake they will exert internal expansion and this expansion will be sufficiently powerful to move the fine particles of the stone dust and the smaller sizes of the crushed stone and force them into all the unfilled voids of the composition and the result will be a road topping of perfect inherent stability. I depend for this result largely upon the action of the calcium oxid in combination with proper rolling and compressing of the said composition to provide a perfect topping possessing perfect inherent stability for a bituminous road way.

What I claim is:—

The herein described (process of making a) composition for paving which consists in selecting properly graded crushed stone and stone dust, coating the same with a light oil, then mixing this mass with a heavy asphaltic cement then mixing therewith a due quantity of calcium oxid, and preferably laying the said composition prior to the slaking of the calcium oxid, substantially as and for the purposes set forth.

In testimony whereof I hereunto sign my name.

JOSEPH HAY AMIES.

In presence of—
S. F. KOCH,
WILLIAM J. JACKSON.